United States Patent [19]

Jeanneret et al.

[11] Patent Number: 6,030,593
[45] Date of Patent: Feb. 29, 2000

[54] METHOD FOR PREPARING NICKEL HYPOPHOSPHITE

[75] Inventors: Gilbert Jeanneret, Neuchâtel; Paul Brunner, Choex, both of Switzerland; Dominique Jousset, Courbevoie, France

[73] Assignee: CECA S.A., Puteaux, France

[21] Appl. No.: 09/043,991

[22] PCT Filed: Aug. 2, 1996

[86] PCT No.: PCT/FR96/01233

§ 371 Date: Aug. 19, 1998

§ 102(e) Date: Aug. 19, 1998

[87] PCT Pub. No.: WO97/12836

PCT Pub. Date: Apr. 10, 1997

[30] Foreign Application Priority Data

Sep. 29, 1995 [FR] France ................... 95 11445

[51] Int. Cl.⁷ .................................. C01B 25/165
[52] U.S. Cl. ............................................. 423/307
[58] Field of Search ................................ 423/307

[56] References Cited

U.S. PATENT DOCUMENTS 3,888,971  6/1975  Scheibitz et al. ............... 423/307
4,552,737  11/1985  Estes ............................ 423/307

FOREIGN PATENT DOCUMENTS

WO 97/12836  8/1996  WIPO .

*Primary Examiner*—Wayne Langel
*Attorney, Agent, or Firm*—Millen, White, Zelano & Branigan, P.C.

[57] ABSTRACT

Nickel hypophosphite is prepared by ion exchange on a carboxylic between nickel sulphate and hypophosphorous acid. The product thus obtained, both in the form of an aqueous solution and of a crystalline salt, is intended in particular for the preparation of chemical nickel plating baths.

4 Claims, No Drawings

METHOD FOR PREPARING NICKEL HYPOPHOSPHITE

TECHNICAL FIELD OF THE INVENTION

The present invention is that of a process for the manufacture of nickel hypophosphite.

PRIOR ART

Nickel hypophosphite is an inorganic salt known since at least 1828 (Rose, Ann. Physik., [12-87-1828]. It crystallizes from its aqueous solutions in the hexahydrate form $Ni(H_2PO_2)_2 \cdot 6H_2O$, It is registered in the Registry file of Chemical Abstracts as RN 13477-97-9. Its constituent components, the hypophosphorous anion on the one hand and the nickel cation on the other hand, are the active species of the well-known chemical nickel plating process which makes use of the autocatalytic oxidation/reduction reaction.

$$NiSO_4 + 2NaH_2PO_2 + 2H_2O \rightarrow Ni + 2NaH_2PO_3 + H_2SO_4 + H_2\uparrow$$

and the baths of which are manufactured from sodium hypophosphite and a soluble nickel salt, generally the sulphate. It might have been thought advantageous to use nickel hypophosphite for this end, with the obvious advantage of not, for no purpose, charging the baths with sodium and sulphate ions which cause difficulties due to the crystallization of sodium sulphate.

The Nouveau Traité de Chimie Minérale [New Treatise on Inorganic Chemistry] by Paul Pascal cites two processes for obtaining nickel hypophosphite, one by double decomposition between nickel sulphate and barium hypophosphite and the other by dissolving nickel hydroxide in hypophosphorous acid. To convert the double decomposition process to an industrial scale, it would be advisable to use calcium hypophosphite as a realistic source of hypophosphite; this results in a nickel hypophosphite which is unsuitable for chemical nickel plating because it contains an excessively large amount of magnesium, the major impurity contributed by the calcium hypophosphite itself, and of calcium, which is not removed from the reaction mixture due to the not insignificant solubility of the calcium sulphate formed. On the other hand, it is the starting material contributing the nickel to the dissolution process, metallurgic nickel hydroxide or nickel carbonate hydroxide, which is the source of contaminants by contribution of heavy metals or magnesium. Due to the lack of an economically acceptable production process, the use of nickel hypophosphite in chemical nickel plating has remained highly restricted.

DISCLOSURE OF THE INVENTION

The process according to the invention overcomes these disadvantages. It consists in retaining the nickel of an aqueous solution of a soluble nickel salt on an ion exchange resin and in eluting it with an aqueous hypophosphorous acid solution. It is thus possible to obtain hypophosphorous solutions assaying 30–35 g/l of nickel, which can be used directly to prepare or regenerate chemical nickel plating baths or from which nickel hypophosphite hexahydrate can be crystallized.

The resin to be used for the invention is a carboxylic resin (weak acid) in the sodium form. This type of resin can be regenerated by concentrated solutions of strong acids. It is thus possible to draw therefrom regeneration solutions which are concentrated in exchanged ions. After regeneration, the resin is in an acidic form which is unfavourable for adsorbing nickel ions: it is brought back to the carboxylate form, and preferably sodium carboxylate form, by treatment with a strong base, in this case sodium hydroxide. This is a highly exothermic reaction (approximately 80 kcal/mol). The chemical nature of the resin is of little importance but its composition must be such that it satisfactorily withstands the osmotic shocks created by the difference in the concentrations of the various reactants which succeed one another in the column during the operation, the thermal shocks due to the exothermicity of the neutralization of the acid resin, and the physical effects resulting from the fact that, in very concentrated solutions, the resin begins to float.

All water-soluble nickel salts are suitable for the invention. Nickel sulphate is preferred because it is easy to remove the sulphate ion from the effluent via a salt which precipitates this anion, for example a calcium salt. The pH of the nickel salt solution must be as close as possible to 6 in order for the resin not to experience a loss in capacity because of an excess of $H^+$ ions. The addition of acid will thus be avoided, which is sometimes carried out in order to prevent the precipitation of nickel hydroxide and to accelerate the dissolution of the salt.

The source of hypophosphite ions of the invention is hypophosphorous acid. Sodium hypophosphite is not effective in extracting the retained nickel ions, at least to an acceptable concentration level of nickel ions in the effluent.

The operating temperature is partly set by the concentrations of the solutions (nickel salt, hypophosphorous acid, sodium hydroxide) and by the rate of their introduction into the column: it is necessary to prevent the resin being detrimentally affected by an excessive rise in temperature due to the interaction of excessively high concentrations and throughputs. Moreover, with an excessively high throughput, ion exchange becomes partial. It is up to the person skilled in the art to achieve a correct balance under the conditions which are available to him. Attempts should be made neither to exceed 80° C. nor to fall below 25° C. and in any event an excessively low temperature is avoided during the phase of elution of the nickel with hypophosphorous acid, in order to prevent the hypophosphite from precipitating in the column.

The process is quantitative with respect to nickel. It provides aqueous nickel hypophosphite solutions at concentrations varying from 1 to 35 g/l of nickel. These solutions can be used directly by nickel platers in preparing their chemical nickel plating baths. It is possible to add complexing agents in order to prevent highly concentrated solutions (more than 30 g/l of $NiSO_4$) from crystallizing when cold. It is also possible to crystallize these solutions in order to remove nickel hypophosphite hexahydrate therefrom, for example by evaporation under vacuum at moderate temperature (<50° C.), in order to avoid oxidation, and then crystallization by controlled cooling.

The nickel hypophosphite resulting from the process according to the invention exhibits the appreciable advantange, for nickel plating, of limiting to a very substantial degree the impurities introduced into the baths by the reactants contributing the hypophosphite and nickel ions. This may be convincingly shown by considering the comparative contents of the conventional reactants (sodium hypophosphite and nickel sulphate, on the one hand, and nickel hypophosphite according to the invention, on the other hand):

| Impurity | Sodium hypophosphite | Nickel sulphate | Nickel hypophosphite |
| --- | --- | --- | --- |
| Ca | 20–40 ppm | | 11.5 ppm |
| Fe | <3 ppm | 40 ppm | <1 ppm |
| Pb | <1 ppm | 1 ppm | <1 ppm |

EXAMPLE

The reactants 0.856 mol/l nickel sulphate solution: 225 g (0.856 mol) of $NiSO_4.6H_2O$ are dissolved in one liter of demineralized water.

2.5 mol/l hypophosphorous acid solution: 6 liters of 50% $H_3PO_2$ [d=1.21], i.e. 9.2 mol, are diluted with 14 liters of demineralized water.

Standard 30% sodium hydroxide solution.

Macroporous Amberlite IRC 76 ion exchange resin.

The procedure 1 liter of resin is charged, in a column of at least 1 l 25, with 770 ml of 0.856 mol/l nickel sulphate solution, i.e. 38.7 g of $Ni^{2+}$. Rinsing is carried out with demineralized water (approximately 1.5 liters) until sulphate is no longer present in the rinse water. The nickel is displaced with 770 ml of 2.5 mol/l hypophosphorous acid (during this operation, the liter of resin contracts to 770 ml) and rinsing is then carried out with demineralized water. 1060 ml of eluate and of rinse water, which contain 38.7 g of $Ni^{2+}$, are recovered in the form of a solution containing 0.622 mol/l of $Ni^{2+}$ and 1.866 mol/l of $H_2PO_2^-$ (hypophosphite/nickel molar excess of 1.5).

The resin is regenerated by charging with 230 ml of 30% sodium hydroxide and then rinsing with demineralized water to neutral pH.

A resin is thus obtained which is ready to be employed for receiving a fresh charge of nickel sulphate.

We claim:

1. A process for the preparation of nickel hypophosphite, characterized in that the preparation is carried out by ion exchange on an ion exchange column between a water-soluble nickel salt and hypophosphorous acid.

2. A process according to claim 1, characterized in that the ion exchange resin is a carboxylic resin in the sodium form.

3. A process according to claims 1, characterized in that the nickel salt is nickel sulphate.

4. A process according to claim 2, characterized in that the nickel salt is nickel sulphate.

* * * * *